W. H. THOMPSON.
CLOCK.
APPLICATION FILED MAR. 15, 1915.
1,154,076.
Patented Sept. 21, 1915.
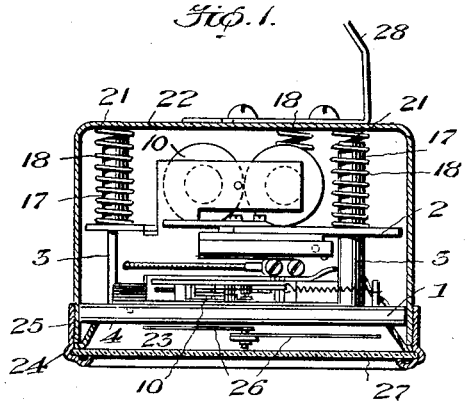
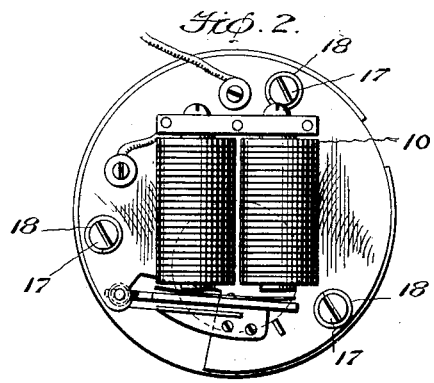
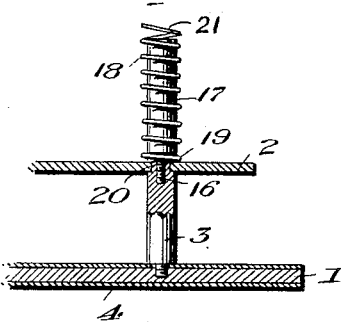
Inventor
William H. Thompson
By
His Attorney
Witnesses

UNITED STATES PATENT OFFICE.

WILLIAM H. THOMPSON, OF MEMPHIS, TENNESSEE, ASSIGNOR TO THOMPSON ELECTRIC CLOCK COMPANY, OF MEMPHIS, TENNESSEE, A CORPORATION OF TENNESSEE.

CLOCK.

1,154,076. Specification of Letters Patent. Patented Sept. 21, 1915.

Original application filed October 28, 1914, Serial No. 869,014. Divided and this application filed March 15, 1915. Serial No. 14,489.

*To all whom it may concern:*

Be it known that I, WILLIAM H. THOMPSON, a citizen of the United States, residing at Memphis, county of Shelby, and State of Tennessee, have invented certain new and useful Improvements in Clocks, of which the following is a specification.

This invention relates to clocks.

The present application is a division of my application, Serial No. 869,014, filed October 28, 1914, for electric automobile clocks.

While the subject-matter is particularly adapted for use as a part of an electric automobile clock constructed according to the disclosures of my said application, I do not limit myself to its use with the elements, constructions and combinations of the electric automobile clock of that application, as the present improvements are susceptible of use in connection with any clock, and more particularly, are intended for use on clocks used for automobile, railway and marine service in any situation where the clock is subject to vibration, shock or jar.

My object is to provide improved means for cushioning a clock movement in its shell or case and for absorbing shocks, jars or vibrations to which the clock may be subject due to its location, to thereby prevent interference with the time-keeping properties of the clock; further, to hold the entire movement in its shell or case without fastenings and to prevent twisting, rattling or loosening of the bezel and to make it watertight and to prevent any buckling of the plates of the clock movement.

Further objects will appear more fully and at large hereinafter.

The invention comprehends the provision of shock absorbing springs which are so combined with the apparatus and the shell or case holding it that the entire movement is spring-cushioned and secured without fastenings, by pressure against the bezel. This shock absorbing means keeps the bezel from twisting and rattling and holds the plates of the movement together in case the screws should loosen and prevents vibration from interfering with the relationship of the parts and their operation. The relationship of the shock absorbing or cushioning springs to the screws, is an improved one, whereby the spring is held in position, while loosely surrounding the screw so that the screw and spring may have relative longitudinal free movement without binding to compensate for vibration and at the same time to prevent buckling of the springs.

The invention consists further, in the relationship and combination of the cushioning springs with the case and with the pillars which connect the plates of the frame of the clock, whereby the cushioning and shock absorbing springs provide a multipoint pressure directly over the pillars, thus rendering it impossible for the pressure to buckle the plates of the clock frame.

The invention consists still further in those features, constructions and combinations of parts appearing more fully and at large hereinafter and recited in the appended claims.

In the accompanying drawings: Figure 1 is a longitudinal section through the case and bezel, illustrating the use of my invention in connection with an electrically wound clock movement such as set forth in my application, Serial No. 869,014; Fig. 2, a plan view looking toward the ends of the cushioning springs, the movement having been removed from the case or shell; and Fig. 3, a detail view partly in section, showing one of the cushioning and shock absorbing springs and its relationship to a retainer guide and to a pillar connecting the front and back plates of the clock frame.

In the drawings I have shown my improvements applied to an electrically wound clock of the construction set forth in my application, Serial No. 869,014, filed October 28, 1914, but this is by way of illustration and I do not limit the invention to use in connection with any particular kind of clock, clock movement, or case, except in the particulars set forth in the claims.

The operative parts of the clock movement are carried by a front plate 1 and back plate 2 which are spaced apart and connected together by pillars 3. Secured to the face of the front plate 1 is a dial 4. Passing through the back-plate 2 are the screw-threaded ends 16 of the retaining guides 17. The said guides 17 clamp the back-plate 2 to the pillars or spacing members 3 and the plates 1 and 2 are thus held in proper relation to each other.

The shock absorbing coil springs 18 (Figs.

1 and 3) loosely surround the retaining guides 17, but at their inner ends they are constricted as at 19 and enter a reduced annular portion 20 of the retaining guides, whereby the spring is held against detachment, but the remaining coils are loose and free from the retaining guide and adapted to permit the latter to move longitudinally in relation to them to absorb vibrations. At the same time, the inner ends 19 of the spring bear against the back-plate 2 and form an end-lock, as it were, to prevent unscrewing of the parts 16.

Referring to Fig. 1, the outer ends 21 of the springs bear against the back of the shell or case 22 which houses the clock, and the proportions of the parts and length of the springs is such that the springs are under constant tension and hold the dial 4 against the spacer shell 23 and through said shell, press upon the bezel 24 and lock it against rattling or looseness where it is connected by screw-threads 25 to the shell 22. No fastenings of any kind are employed to secure the entire apparatus, including the movement 10, electro-magnet, armature, and power means in position. The tension of the springs 18 is such that the pressure they exert on the shell and on the back-plate 2 is sufficient to hold the dial 4 firmly against the ring 23 at all times without requiring separate fastenings and to prevent twisting or chattering due to the vibration to which the clock may be subjected, as for instance, when in use on an automobile. At the same time, the retaining guides 17 being shorter than the springs 18, permit a cushioning and shock absorbing relative movement of the parts without separation. Preferably, there will be but three pillars 3 placed at equal distances apart as such arrangement provides for all possible movements. I do not limit myself, however, to the use of but three springs and retaining guides. The hands which travel in front of the dial 4 are shown at 26 and the glass face of the clock at 27. The shell or case is preferably provided with a bracket 28 which is partly broken away in Fig. 1, by which the clock may be secured to the dash of the automobile in suitably inclined position for easy observance.

It will be seen from Fig. 3 that the pressure of each spring 18 is applied in line with the end of a pillar 3 and consequently, there is no tendency to buckle either the plate 2 or the plate 1. The springs 18 not only hold the parts of the clock movement together, but they absorb the jar and vibration and keep the bezel in position, making it watertight.

I do not limit myself to the use of three springs, but such construction is advantageous as a three point pressure provides for all movements and, being directly applied over the pillars, it is impossible to buckle the plates of the clock movement.

I am aware that modifications can be resorted to in carrying out my invention and I, therefore, consider myself entitled to all forms coming within the spirit and scope of the invention.

Having thus described my invention, what I claim as new and desire to secure by Letters Patent, is:

1. In a clock, the combination with a case, of a removable movement having a dial plate which bears against and is arrested by the front part of the case, and whose rear or inner part is free from the case, and cushioning and shock absorbing spring means carried by, and self-contained with, the movement and interposed between the rear part of the movement and the case, serving to normally hold the dial plate against the front part of the clock, said movement being adapted to be bodily removed, with the cushioning means, from said case.

2. In a clock, the combination with a case, of a movement having a dial plate which bears against and is arrested by the front part of the case, and whose rear or inner part is free from the case, retaining guides carried by the frame of the movement at the rear thereof, and coil springs surrounding said retaining guides and bearing against the case, whereby the movement is spring-cushioned in the case.

3. In a clock, the combination with a case, of a movement having a dial plate which bears against and is arrested by the front part of the case, and whose rear or inner part is free from the case, retaining guides carried by the rear of the frame of the movement, and coil springs surrounding said retaining guides, the inner coils of said springs being engaged with the guides and the remaining portions of the springs being loose on the guides, adapted for relative movement thereon, and bearing against the case, whereby the movement is spring-supported in said case.

4. In a clock, the combination of a case, movement frame plates, pillars interposed between the frame plates and having a screw connection with one of them, retaining guides having a screw connection with said pillars, and coil springs surrounding said retaining guides and bearing against the other of said frame plates and against the case, whereby the frame plates are spring-supported in the case and the joints of the guides and pillars are locked.

5. In a clock, the combination with a case, of a movement having a dial plate which bears against and is arrested by the front part of the case, and whose rear or inner part is free from the case, said movement comprising frame plates, pillars connecting the frame plates, shouldered retaining guides projecting freely from the rear of the frame plates and engaged with the pillars at their inner ends, and coil springs surrounding said retaining guides, the inner coils of said springs being located between the shoulders of the retainers and the frame plates and the remaining portions of the springs being loose on the guides, adapted for relative movement thereon, and bearing against the case, whereby the movement is spring-supported in said case and the joint between the retainers and pillars is locked.

In testimony whereof, I hereunto affix my signature in presence of two witnesses.

WILLIAM H. THOMPSON.

Witnesses:
 FRANK F. DAVIS,
 JOHN W. FARLEY.

Copies of this patent may be obtained for five cents each, by addressing the "Commissioner of Patents, Washington, D. C."